United States Patent [19]

Limuti et al.

[11] Patent Number: 4,809,150
[45] Date of Patent: Feb. 28, 1989

[54] DC TO DC CONVERTER WITH FEED FORWARD AND FEED BACK REGULATION

[75] Inventors: Donald Limuti, Kirkland; James M. Ross, Bothell, both of Wash.

[73] Assignee: Electric Power Research Institute, Inc., Palo Alto, Calif.

[21] Appl. No.: 148,945

[22] Filed: Jan. 27, 1988

[51] Int. Cl.$^4$ .......................................... H02M 3/335
[52] U.S. Cl. ...................................... 363/21; 363/49; 363/56
[58] Field of Search ............................ 363/21, 49, 56; 323/288, 299, 300

[56] References Cited

U.S. PATENT DOCUMENTS

| | | | |
|---|---|---|---|
| 4,187,536 | 2/1980 | Govaert et al. | 363/21 |
| 4,439,820 | 3/1984 | Kuhn et al. | 363/21 |
| 4,459,539 | 7/1984 | Cordy | 323/299 |
| 4,546,421 | 10/1985 | Bello et al. | 323/288 |
| 4,683,528 | 7/1987 | Snow et al. | 363/21 |

FOREIGN PATENT DOCUMENTS

| | | | |
|---|---|---|---|
| 2461654 | 7/1976 | Fed. Rep. of Germany | 363/21 |
| 83463 | 6/1980 | Japan | 363/21 |
| 112880 | 9/1981 | Japan | 363/21 |
| 96866 | 6/1984 | Japan | 363/21 |
| 84/00085 | 1/1984 | PCT Int'l Appl. | 363/21 |

OTHER PUBLICATIONS

Caloo et al., "Circuit to Linearize the Control Loop of a Switching Voltage Regulator", vol. 22, No. 6, pp. 2191–2192, Nov. 1979.

Primary Examiner—William H. Beha, Jr.
Attorney, Agent, or Firm—James B. Hinson

[57] ABSTRACT

A DC to DC converter capable of operating from a power source whose output voltage may change over a 10 to 1 range. A switching modulator is used to convert the DC input voltage into a pulsed voltage. Feed forward control techniques are used to control a switching modulator to rapidly compensate for changes in the amplitude of the input voltage. Feed back techniques are used to maintain the output voltage at the desired value. Isolation between the input and output is provided using a transformer to couple the switching circuits to a rectifier and filter which produces the output voltage. A filter optic link provides isolation for the feed back signal.

8 Claims, 4 Drawing Sheets

DC TO DC CONVERTER WITH FEED FORWARD AND FEED BACK REGULATION

BACKGROUND OF THE INVENTION

1. Field of the Invention

The invention relates to electronic circuitry and more specifically to electronic circuitry for converting a variable DC voltage into a substantially constant DC voltage.

2. Summary of the Prior Art

Electronic circuits for converting a first DC voltage into a second DC voltage are well known in the prior art. Typically these circuits utilize an electronic regulator in which the amplitude of the output voltage was sampled and fed back to the regulator to control the output voltage to the desired value. While these performed the desired function, they were typically relatively slow in responding to changes in the amplitude of the input voltage. This characteristic was due to delays in the feedback circuits which typically range from 1 msec to 500 msec.

SUMMARY OF THE INVENTION

The DC to DC converter which is the subject matter of this invention provides an improved DC to DC converter for use in environments where the input voltage changes substantially over a short time interval. Specifically, the DC to DC converter comprising the preferred embodiment of the invention was designed to operate from an input voltage source whose amplitude could vary between approximately 60 and 600 volts DC to produce a substantially constant output voltage of approximately 40 volts. The overshoot of the output voltage resulting from a change in the input is reduced by a factor of at least 10 as compared to prior art DC to DC converters by using both feed forward and feed back techniques. Additionally, the output of the DC to DC converter is electrically isolated from the input up to approximately 10,000 volts. DC to DC converters having these features are not believed to be available in the prior art.

DETAILED DESCRIPTION

Figure 1:
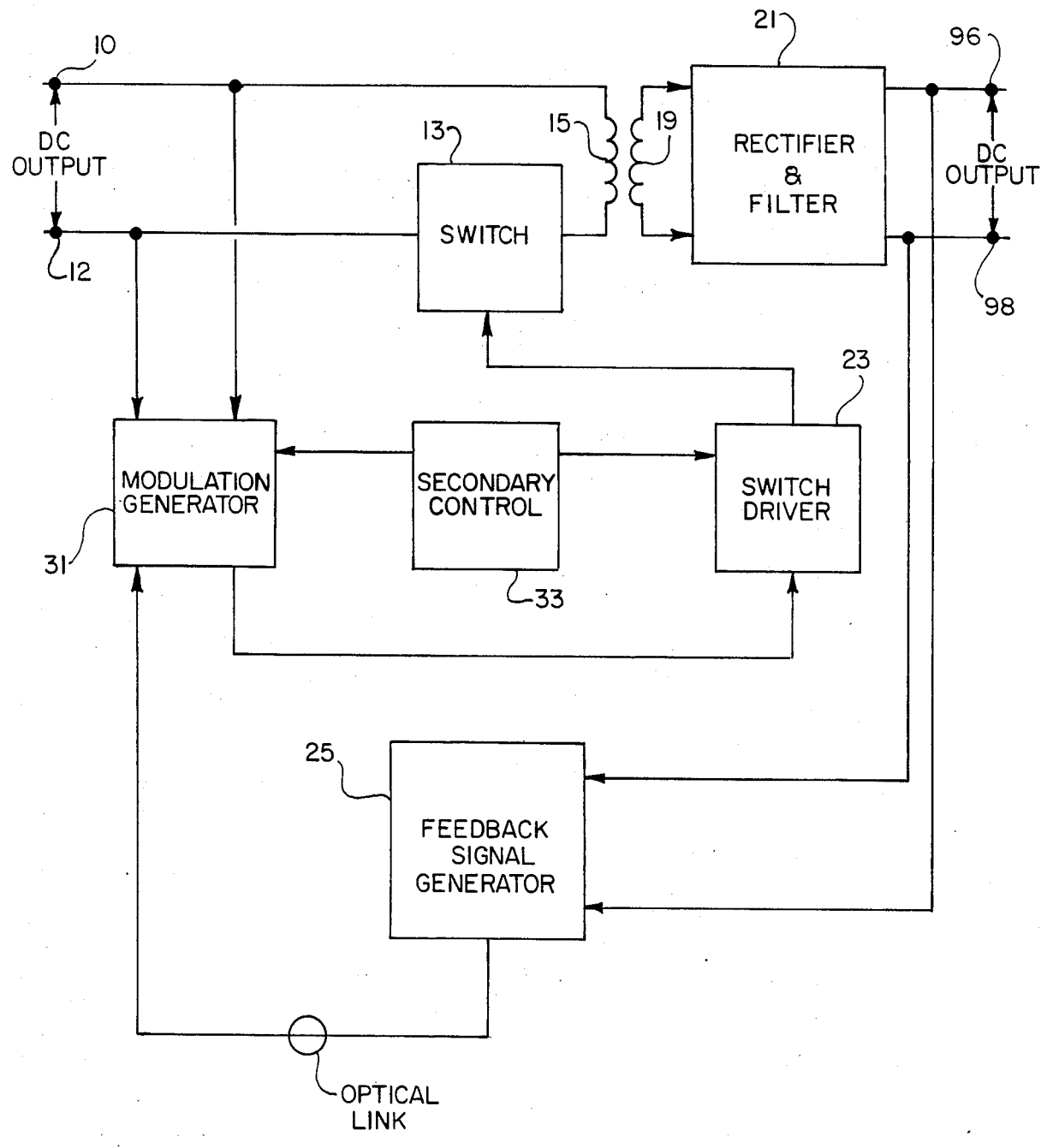
FIG. 1 is a functional block diagram of the invention.

FIG. 1 is a generalized, functional, block diagram of the DC to DC converter comprising the preferred embodiment of the invention. Operating power is supplied to the DC to DC converter by respectively coupling the positive and negative output terminals of the power source (not illustrated) to the positive and negative input terminals, 10 and 12, of the DC to DC converter.

A switch 13 is series coupled with the primary winding 15 of an isolation transformer to the input terminals, 10 and 12, of the DC to DC converter. Switch 13 is controlled (turned on and off) by a pulse width modulated signal generated by a modulation generator 31 to produce a pulse width modulated voltage at the terminals of the primary winding 15 of the transformer. The current associated with this pulse width modulated voltage will depend on operating conditions.

A pulse width modulated voltage is produced at the terminals of the secondary winding 19 of the isolation transformer. This voltage is coupled to the input terminals of a rectifier and filter circuit 21 to produce the DC output voltage of the DC to DC converter. Feedback to the input of the modulation generator 31 is provided by a feedback signal generator 25.

During abnormal operating conditions, signals generated by the secondary control circuitry 33 inhibits the modulation generator 31 and the switch driver 23 to turn off or hold off the switch 13 until conditions stabilize sufficiently to permit normal operation.

Electrical isolation between the feedback signal generator 25 and the modulation generator 31 is provided by an optical link 27. Feed forward control is provided to rapidly compensate for changes in the output voltage of the power source providing power to the DC to DC converter by coupling the voltage present at the input terminals of the DC to DC converter to the modulation generator 31. Modulation generator 31 responds very rapidly to compensate for changes in the input voltage, as subsequently described in detail.

More specifically, in response to the above described signals, the modulation generator 31 generates a pulse width modulated reference signal which turns switch 13 on and off. This provides both feed forward and feed back control signals to rapidly compensate for changes in operating conditions and maintain the output voltage at the desired value.

During normal operation, the duration of the on time of the switch 13 associated with each pulse of this signal changes inversely with respect to both the input voltage and the output voltage of the DC to DC converter to maintain the output voltage at the desired value. Secondary control circuitry 33 generates signals which interact with the modulation generator 31 and the switch driver 23 to provide a soft start when the operating power supply is turned on, to turn the DC to DC converter off when the output voltage of the power source is not sufficient to maintain the output voltage of the DC to DC converter at the desired value and to turn the switch 13 off when the instantaneous current flowing through this switch exceeds a preselected value. The operation of the DC to DC converter is more specifically described below with reference to FIG. 2, 3 and 4 which collectively comprise a detailed schematic diagram of the invention.

Figure 2:
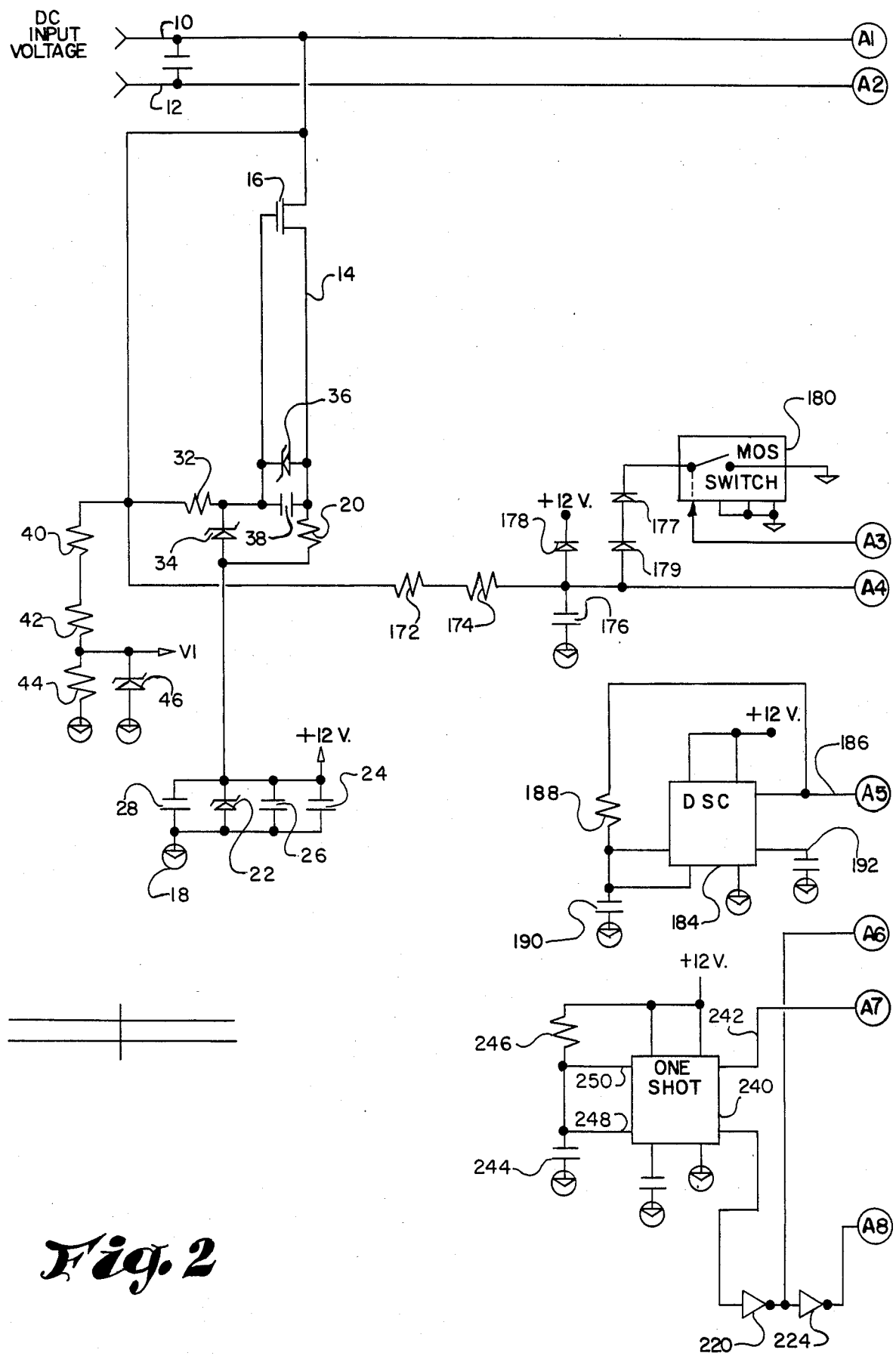
FIGS. 2, 3, and 4 taken collectively comprise a detailed schematic diagram of the experimental model of the invention.
Figure 3:
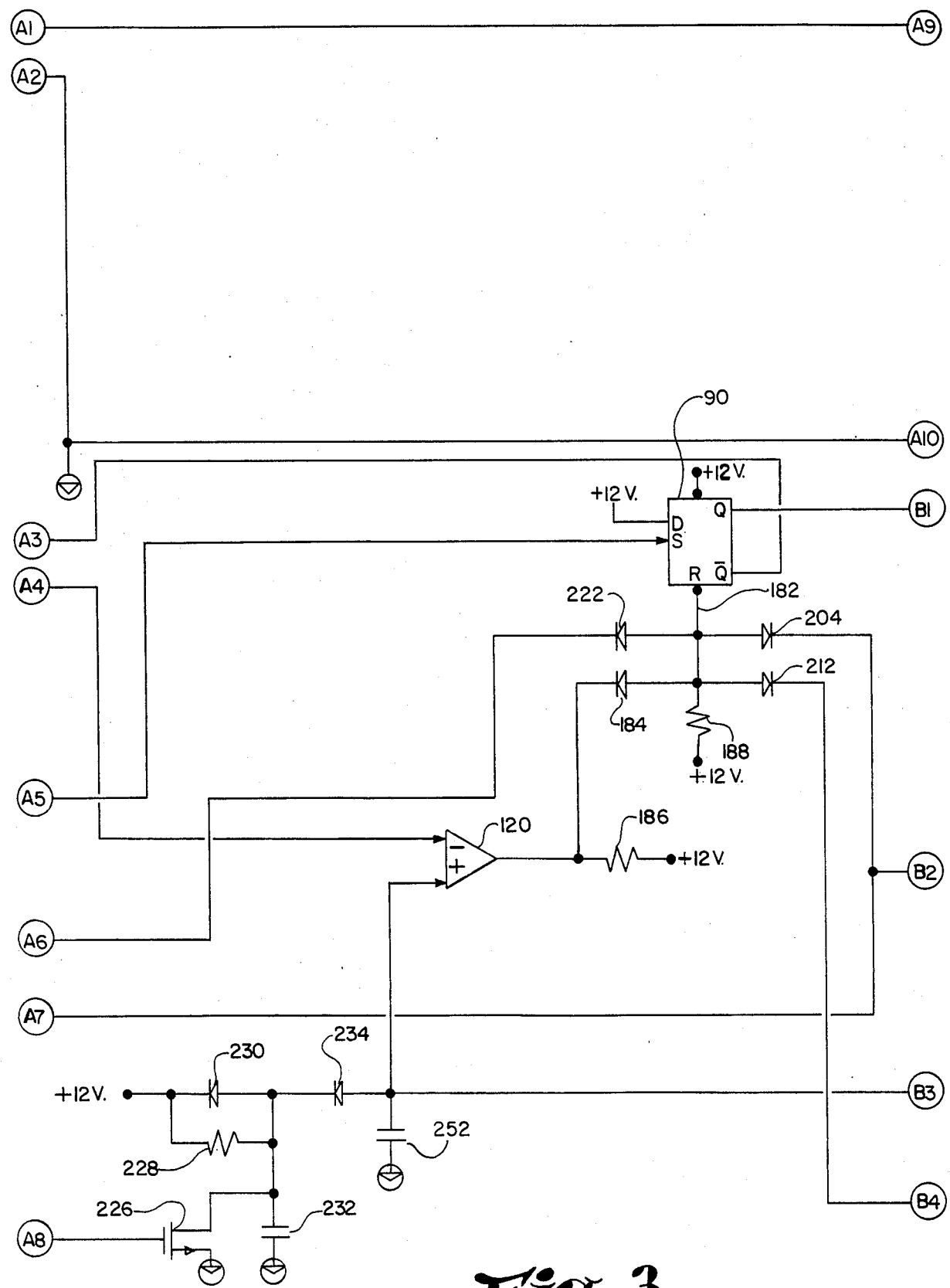
Figure 4:
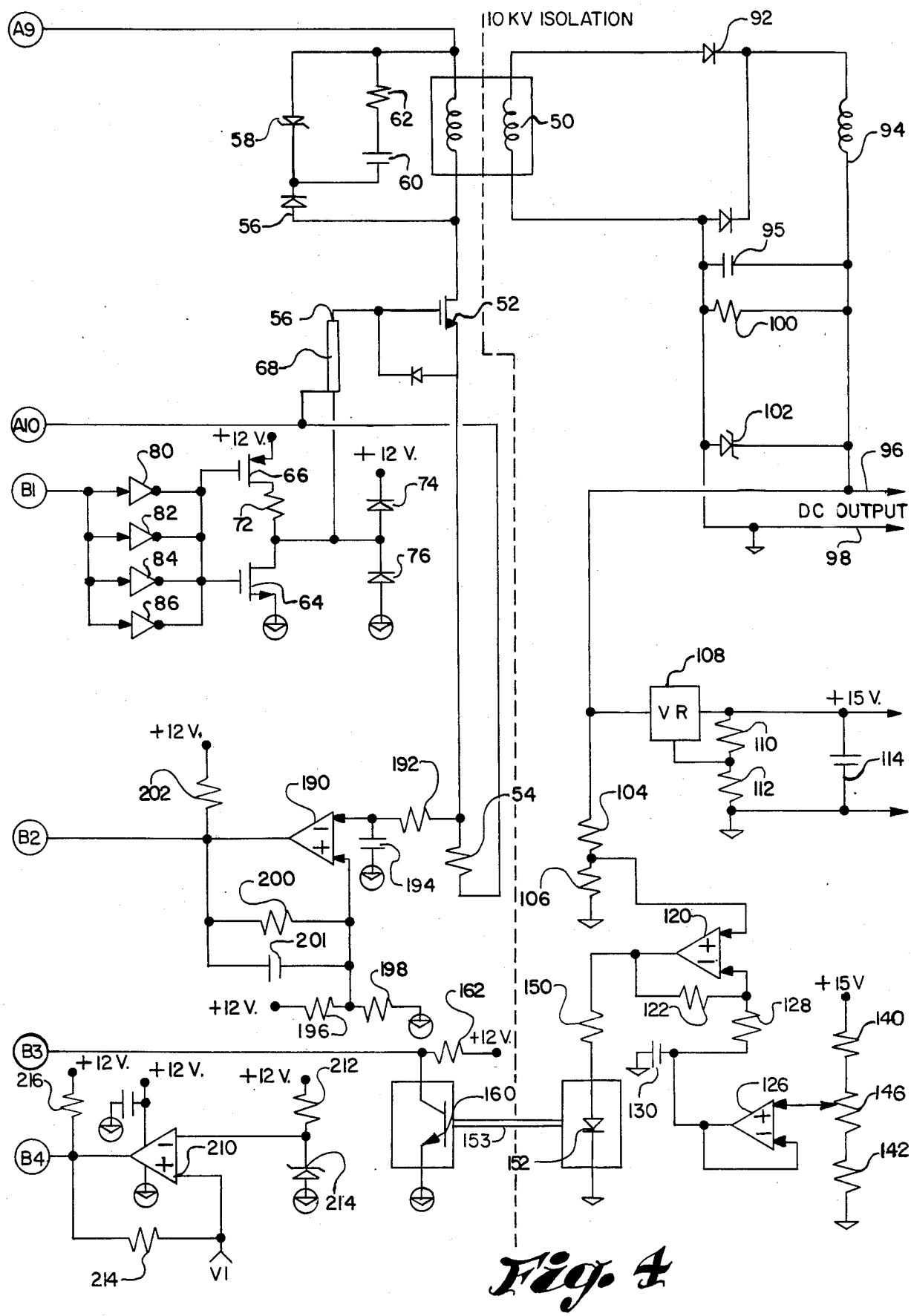

A detailed, schematic diagram of the experimental model of the invention is provided by the combination of FIGS. 2, 3, and 4. The operation of the circuitry comprising the preferred embodiment of the invention will be described with reference to these three schematic diagrams.

More specifically, the positive and negative input terminals of the voltage source to be used to supply electrical power to the DC to DC converter are respectively coupled to the input terminals, 10 and 12, of the DC to DC converter. As previously discussed, the output voltage of the power source may vary over approximately a 10 to 1 range. In the experimental model this range was 60 to 600 volts DC. This varying DC voltage is also utilized as the power source to generate voltage sources supplying operating power to the control circuits of the DC to DC converter.

Operating voltages for the low power portions of the control circuits are generated utilizing a constant current source. The constant current is approximately 12 milliampere and is available at the output of current sense resistor 20 (FIG. 2). More specifically, the drain terminal of a MOS transistor 16 is coupled to the positive input terminal 10 of the DC to DC converter. The source terminal of the MOS transistor 16 is coupled to the ground terminal 18 of the circuit through the series combination of current sense resistor 20 and the parallel combination of a zener diode 22 and capacitors 24-28. A portion of the 12 milliampere of current available at the source of the MOS transistor 16 flows through the zener diode 22 to produce +12 volts which is used as a power supply for portions of the DC to DC converter. Capacitors 24, 26 and 28, comprise a filter for the +12 volt DC source.

A positive voltage is produced at the gate of the MOS transistor 16 by a circuit consisting of the series combination of a resistor 32 and a zener diode 34 coupled between the positive input terminal 10 of the DC to DC converter and the positive terminal of the +12 volt voltage source, previously discussed. Negative feedback is provided by current sense resistor 20 to maintain the current through the MOS transistor 16 substantially constant at a value primarily determined by the voltage across the zener diode 34 and the value of current sense resistor 20. As previously discussed, these components are selected to produce a source current of approximately twelve milliamperes. Additionally, another zener diode 36 in combination with a filter capacitor 38 limits the source to gate voltage of the MOS transistor 16 to a safe value and provides filtering to maintain the gate to source voltage substantially constant.

In order to assure the proper operation of the DC to DC converter, it is necessary to provide an orderly shut down sequence when the DC input voltage from the power source decreases below a predetermined lower limit. A low voltage shutdown reference signal V1, utilized to initiate the low voltage shut down process is provided by the series combination of resistors 40, 42, and 44. The low voltage shut down reference signal, V1, is available at the common terminal of resistors 42 and 44, with the amplitude of this signal limited by a zener diode 46 connected in parallel with resistor 44.

A switching modulator is utilized to produce a pulsed electrical signal which is rectified and filtered to produce the desired output voltage. More specifically, the primary of a transformer 50 (FIG. 3) is coupled through a MOS switching transistor 52 and a current sensing resistor 54 to the input terminals, 10 and 12, of the DC to DC converter. MOS switching transistor 52 is driven by an appropriate pulse width modulated signal coupled to its gate terminal 56 to produce the desired DC voltage at the output of the DC to DC converter, as more specifically described below.

When the pulse width modulated signal at the gate terminal of the MOS switching transistor 52 has a sufficiently high positive value with respect to the source terminal, this transistor turns on permitting current to flow from the negative input terminal 12 of the DC to DC converter, through the MOS switching transistor 52, through current sensing resistor 54 and through the primary winding of transformer 50 to the positive input terminal 10. Transistor 52 is turned off by sufficiently reducing the amplitude of this pulse width modulated signal. As MOS transistor 52 turns off, the current flowing in the primary winding of transformer 50 decreases inducing a voltage in the this winding which forward biases a conventional diode 56. As the current flow through switching transistor 52 is turned on and off, a pulsed voltage necessary to produce the required DC output voltage is induced in the secondary winding of isolation transformer 50.

Diode 56 is coupled to the second terminal of the primary of transformer 50 by a 150 volt zener diode 58 in parallel with a filtering circuit comprising a capacitor 60 in series with a resistor 62. This forms a conventional snubber circuit to control the amplitude of voltage transients generated at the terminals of the primary winding of the transformer 50 as the current through this winding decreases.

The pulse width modulated signal required to drive the MOS switching transistor 52 is produced by a totem pole amplifier circuit comprising two MOS transistors, 64 and 66. In the experimental model, the switching rate of the MOS switching transistor 52 was in the neighborhood of 25 kilohertz. This required precautions to be taken to reduce noise generated by high frequency switching transients. As a noise reduction measure, the output of the totem pole amplifier circuit is coupled to the gate of the MOS switching transistor 52 by a coaxial cable 68.

In order to limit cross conduction currents for the totem pole amplifier circuit, the drain terminals of transistors 64 and 66 are connected together through a resistor 72. Clamping diodes, 74 and 76, respectively limit the positive and negative transitions of the output signal of the totem pole amplifier to approximately zero and +12 volts DC. A suitable drive signal is provided to the commonly connected gate terminals of the MOS transistors, 64 and 66, comprising the totem pole amplifier by the combination of four parallel connected buffer amplifiers, 80 through 86. Connecting substantially identical buffer amplifiers in parallel was found to be a convenient technique for supplying sufficient current to drive the totem pole amplifier circuit at a relatively high switching rate. This current is needed because the input to this amplifier is capacitive, thus requiring considerable current to drive this circuit at the switching rates utilized.

Drive to the parallel connected buffer amplifiers 80-86 is provided by a pulsed signal available at the Q output terminal of an on-time latch circuit 90 (FIG. 3). More specifically, the signal at the Q output terminal of the on-time latch circuit 90 is amplified by buffers 80 through 86 to produce a signal having sufficient amplitude and energy to drive the MOS switching transistor 52 at the required rate. Suitable signals for controlling the on time latch 90 are generated by circuitry responsive to the voltages present at the input terminals, 10 and 12, the output terminals, 96 and 98, of the DC to DC converter and the current flowing through the MOS switching transistor 52. Generation of these control signals and operation of the other circuitry comprising the DC to DC converter are further described below.

To produce the desired DC output voltage, the pulsed voltage available at the terminals of the secondary winding of the transformer 50 is rectified by a conventional diode 92 and filtered. Filtering is provided by an inductor 94 which is series coupled with a filter capacitor 95 between the rectifier diode 92 and the output ground terminal 94. Operation of the DC to DC converter under low output current conditions is improved by resistor 100 coupled between the output terminals, 96 and 98, to provide a minimum load. A transorb 102 further limits transients which might appear across the output terminals of the DC to DC converter. Electrical isolation between the MOS switching transistor 52 and output terminals is provided by the transformer 50 and thus it must be insulated between its primary and secondary windings to withstand the voltages which may appear between the voltage source providing the input power and the source utilizing the output voltage. Isolation of the circuits which generates the voltage feed back signal is also required. Circuitry performing this isolation function is subsequently described. Also the transformer 50 should be designed to operate efficiently under the high speed switching conditions described above.

The positive output terminal 96 of the DC to DC converter is coupled to ground by two series connected resistors 104 and 106. A conventional voltage regulator module 108 is also coupled between the positive output terminal 96 and the ground output terminal 98 to produce an isolated source of +15 volts. Operating output voltage for the voltage regulator module 108 is set by a series resistor divider network comprising two resistors 110 and 112. Filtering for the +15 volt supply is provided by a filter capacitor 114.

A feed back reference signal having a predetermined relationship to the output voltage of the DC to DC converter is available at the common terminal of a series resistor divider network comprising resistors 104 and 106. This feed back reference signal is coupled to the positive input of an operational amplifier 120. Feed back to stabilize the gain of the operational amplifier 120 is provided by a resistor 122 coupled between the output of this amplifier and its negative input terminal. A second signal coupled to the negative input terminal of the operational amplifier 120 is generated by a second operational amplifier 126. Input and feed back resistors, 128 and 122, determine the gain of operational amplifier 120. A capacitor 130 filters the output signal of operational amplifier 126. Operational amplifier 126 is connected in a non-inverting unity gain configuration with a manually adjustable output voltage select reference signal provided to the positive input terminal of this amplifier by the series combination of two resistors, 140 and 142, and a potentiometer 146.

An optical feed back signal having a predetermined relationship to the feed back reference signal and the amplitude of the output voltage select reference signal is produced by coupling the output signal of operational amplifier 120 to the output ground terminal 98 through the series combination of a resistor 150 and a light emitting diode 152. More specifically, variations in the voltage appearing between the positive and negative output terminals, 96 and 98, of the DC to DC converter result in a change in the voltage at the plus terminal of operation amplifier 120. Similarly, a change in the position of potentiometer 146 results in a change at the negative input terminal of operational amplifier 120. Operational amplifier 120 produces a composite output signal having a predetermined relationship to both the feed back reference signal and the output voltage select reference signal. This composite voltage produces a current through the light emitting diode 150 to produce an optical output signal.

The optical output signal produced by light emitting diode 152 is coupled by a fiber optic link 153 to the input of an optically operated transistor 160. This fiber optic link isolates the amplifier 120 from transistor 160. The emitter terminal of transistor 160 is coupled to the input ground terminal.

Operating power is supplied to the collector of the optically operated transistor 160 by the +12 volt power supply through a resistor 162. This produces at the collector terminal of the optically operated transistor 160 a comparison signal having a predetermined relationship to the output voltage of the DC to DC converter and to the manually adjustable output voltage select reference signal. This comparison signal is coupled to the positive input terminal of a comparator 120. The negative input terminal of this comparator is coupled to the output of a ramp generator which generates a pulse width modulated ramp signal with the slope of each pulse having a predetermined relationship to the amplitude of the voltage coupled to input terminals, 10 and 12, of the DC to DC converter.

More specifically, a series circuit consisting of two series coupled resistors 172 and 174 (FIG. 2) and a capacitor 176 is coupled between the positive input terminal 10 and the input ground terminal 12. A diode 178 coupled between the common junction of resistor 17 and capacitor 176 clamps the voltage at this junction to +12 volts DC. A solid state MOS switch 180 is turned on and off to periodically couple this common junction to ground through two series connected diodes, 177 and 179, to reset the pulse width modulated ramp signal.

The inverted (not Q) output signal of the on-time latch 90 is coupled to the input of this switch to turn this switch on and clamp the output voltage of the ramp generator to ground when the on-time latch 90 is in the "off" state. Conversely, when the on-time latch 90 is switched to the "on" state, this switch is turned off permitting capacitor 176 to begin charging to generate a voltage whose amplitude increases as a function of time with the slope determined by the magnitude of the voltage present between the input terminals, 10 and 12, and the time constant of the charging circuit consisting of resistors 172 and 174. Resetting the on-time latch 90 discharges capacitor 176 through series coupled diodes 177 and 179. The signals turning off the on-time latch 90 are modulated, alternately charging and discharging capacitor 176 to generate the pulse modulated ramp reference signal, as more specifically described below.

More specifically, the on-time latch 90 is turned off by the negative transitions of a pulsed signal coupled to its turn-off input terminal 182. Signals from four sources are utilized to turn off the on time latch 90 with the output of the comparator 20 being one source. Operation of the comparator 120 to generate a pulsed signal which turns off the on-time latch 90 will be described first because it is the primary signal for regulating the output voltage of the DC to DC converter during normal operation. The output signal of comparator 120 is modulated using both feed forward and feed back control techniques to maintain the output voltage at the desired level.

In regulating the output voltage of the DC to DC converter, a conventional integrated circuit oscillator module 184 is provided with suitable operating voltages by a bias circuit and produces a pulsed signal having a frequency of approximately 5 kilohertz at its output terminal 186. Suitable bias is provided to the circuit by a resistor 188 and a capacitor 190.

Filtering for the circuit is provided by a second capacitor 192. The pulsed output signal of the oscillator 184 is coupled to the on clock signal terminal of the on-time latch 90 such that on each positive transition of this signal, the on-time latch 90 is turned on to switch the pulsed signal available at the Q output terminal to its positive value. This pulsed signal is coupled through the buffers, 80 through 86, and the totem pole amplifier circuit to turn on the MOS switching transistor 52, as previously described.

As the signal at the Q output terminal of the on-time latch goes positive, the inverted output signal (not Q) goes negative turning off the MOS switch 180 permitting the voltage at the common junction of resistor 174 and capacitor 176 to begin to rise with the rise time being determined by the input voltage to the DC to DC converter and the time constant of resisters 170–174 in combination with capacitor 176. This ramp voltage is coupled to the negative input of comparator 170.

The amplitude of the ramp signal is compared to the comparison signal at the positive input of comparator 120. When the ramp signal exceeds the amplitude of the comparison signal, the output signal of the comparator 120 switches to its low level. As the output signal of the comparator 170 decreases below +12 volts, the isolation diode 184 between the output terminal of comparator 20 and the reset terminal 182 of the on-time latch 90 becomes forward biased decreasing the voltage at the reset terminal 182 of the on-time latch 90 causing the on-time latch to switch to its off state. As the on-time latch 90 turns off the inverted output signal turns on the MOS switch 180 terminating the pulsed ramp signal, as previously described. Switching transistor 52 is also turned off. The slope of the ramp varies with the amplitude of the input voltage to provide feed forward control of the output voltage. The amplitude of the comparison signal at the positive input terminal of the comparator 120 varies with the output voltage to provide feedback control. This cycle repeats with the on-time of the MOS switching transistor 52 being pulse width modulated, as required, to maintain the output voltage of the DC to DC converter at the desired value.

Output pullup for the comparator 120 is provided by a resistor 186 coupled between the output terminal of this comparator and the +12 volt source. Similarly, suitable pull up current is provided to the reset terminal 182 of the on-time latch 90 by a resistor 188 also coupled to the +12 volt source.

Other signals useful in controlling operation during abnormal conditions are also coupled to the off-terminal 18 of the on-time latch 90. These signals turn off the circuit when the input voltage to the DC to DC converter falls below prescribed limits, turn off MOS switching transistor 52 when its source current exceeds a preselected value and delay the start up of the DC to DC converter when voltage is first applied to the input terminals, 10 and 12.

More specifically, the voltage at the common junction of the source terminal of the MOS switching transistor 52 and a resistor 54 is coupled to the negative input of a overcurrent comparator 190 through an input resistor 192. High frequency transients are filtered from the negative input terminal of this comparator by a filter capacitor 194 coupled between this terminal and ground. Two series resistors, 196 and 198, coupled in series between the 12 volt source and the input ground terminal 12 produce an over current reference signal at their common junction. This over current reference signal is coupled to the positive input terminal of over current comparator 190. A feed back circuit comprising a parallel combination of a resistor 200 and capacitor 201 provides hysteresis for the over current comparator 190. The output terminal of the overcurrent comparator 190 is pulled up to the +12 volt power supply by a resistor 202.

Whenever the voltage coupled to the negative input terminal of the over current comparator 190 exceeds the over current reference signal, the output voltage of this comparator switches to its lower value. As the output signal of comparator 190 decreases, diode 204 becomes forward biased reducing the voltage at the turn off-terminal 182 of the on-time latch 90 turning this latch off, limiting the maximum current flowing through MOS switching transistor 52 to a predetermined value.

Similarly, it is desirable to turn off the DC to DC converter whenever the voltage coupled between the input terminals of the DC to DC converter, 10 and 12, decrease below a predetermined value required to produce the desired output voltage. This function is provided by a low voltage shut-down circuit utilizing a low voltage comparator 210. More specifically, a voltage V1 previously described as having a predetermined relationship to the voltage present at the input of the DC to DC converter is coupled to the positive input terminal of the low voltage comparator 210. A low voltage reference signal coupled to the negative input terminal of a low voltage comparator 210 is generated at the common junction of a series circuit consisting of a resistor 212 and a zener diode 214 coupled between the +12 volt source and the input ground terminal 12. Whenever the amplitude of V1 falls below the low voltage reference signal, the output signal of the low voltage comparator 210 decreases and forward biases isolation diode 212. As isolation diode 212 becomes forward biased, the voltage at the off-terminal 182 of the on-time latch 90 decreases turning off the on-time latch 90, which in turn turns off MOS switching transistor 52 to terminate the operation of the DC to DC converter due to insufficient input voltage. Hysteresis for the low voltage comparator 210 is provided by a feed back resistor 214 coupled between its output terminal and its positive input terminal. Output pullup for the low voltage comparator 210 is provided by a resistor 216 coupled between the +12 volt power supply and the output terminal of this comparator.

An orderly start-up of the DC to DC converter when voltage is applied to the DC input 10 is assured by including a delay circuit which holds the MOS switching transistor 52 in the "off" state until the major portions of the control circuitry has stabilized. More specifically, a conventional one-shot oscillator 240 is triggered either from reset input 242 (caused by an overcurrent detected by comparator 190) or by trigger inputs 248 and 250 detecting a low voltage on capacitor 244. This assures that the MOS switching transistor 52 is held in the "off" state for the period of the one shot 240 which permits the remainder of the control circuits to stabilize prior to the operation of the DC to DC converter beginning.

The inverted output signal of the one shot circuit 240 is inverted by a first inverter 220. The output of the first inverter 220 is coupled to the off-terminal 182 of the on-time latch 90 by an isolation diode 222. As the output signal of the inverter 220 decreases the isolation diode 222 becomes forward biased lowering the voltage at the reset terminal 182 resetting the on-time latch 90. The output signal of the buffer 220 is further inverted by a second inverter 224 to produce a signal at the gate terminal of an MOS transistor 226. The drain terminal of MOS transistor 226 is coupled to the +12 volt power supply by the parallel combination of a resistor 228 and a diode 230 and connected to capacitor 232. Capacitor 232 is slowly charged to +12 volts by resistor 228, and quickly discharged by transistor 226, or diode 230. (Diode 230 discharges capacitor 232 when +12 volt power is removed by a loss of input voltage). During the cycle of the one shot 240, capacitor 232 is discharged by the drain of transistor 226, which discharges capacitor 252 through diode 234 to hold the voltage at this terminal near ground. A positive voltage determined by the voltage drop of forward biased diodes 177 and 179 and switch 180 is coupled to the negative input terminal of comparator 120. In this fashion the circuit is disabled by holding the on-time latch 90 in the "off" state during the start-up phase to assure that the +12 volt power supply, the oscillator circuit and the remainder of the circuits have stabilized. The power supply will slowly start up (soft start) as clamp capacitor 232 slowly charges through resistor 228, thereby allowing capacitor 252 to be recharged by resistor 162. The net result of the soft start is to slowly increase the on time of switching transistor 52 from a low value to the value necessary to maintain the output voltage at the desired value.

The DC to DC converter comprising the invention can be constructed using commercially available components. The specific components used to implement the one shot circuit 90, the oscillator circuit 184 and the voltage regulator 108 respectively are 74C74, L555 and TL783. Implementing these functions with other commercially available circuits are possible. However, such implementations may require different circuit arrangements.

We claim:

1. A DC to DC converter for converting an input voltage which may change in amplitude into an output voltage having a substantially constant amplitude utilizing feed forward control to decrease the time required to compensate for changes in said input voltage, comprising in combination:
   (a) means for producing a synchronizing signal;
   (b) means for generating a pulse width modulated ramp signal in response to said synchronizing signal, said input voltage and a signal which terminates each pulse of said pulse width modulated ramp signal; said pulse width modulated ramp signal having a frequency determined by said synchronizing signal;
   (c) means for comparing the amplitude of said pulse width modulated ramp signal to said output voltage to generate a ramp termination signal which selectively terminates each pulse off said pulse width modulated ramp signal;
   (d) means responsive to said synchronizing signal and to said ramp termination signal to generate a pulse width modulated signal;
   (e) switch means responsive to said pulse width modulated signal to periodically couple the primary winding of a transformer between the positive and negative input terminals of said DC to DC converter to produce a pulsed electrical signal available at the terminals of the secondary winding of said transformer; and
   (f) means coupled to the secondary winding of said transformer to convert said pulsed electrical signal to said output voltage.

2. A DC to DC converter in accordance with claim 1 further including feed forward control means responsive to said input voltage to said DC to DC converter to modulate said pulse width modulated ramp signal such that the on time of said switch changes inversely with respect to the amplitude of said input voltage.

3. A DC to DC converter in accordance with claim 2 wherein said means for generating said pulse width modulated ramp signal includes feed back means responsive to said output voltage of said DC to DC converter to modulate said pulse width modulated signal such that the on time of said switch varies inversely with respect to the output voltage of said DC to DC converter.

4. A DC to DC converter in accordance with claim 3 further including means for turning off said switch means when said input voltage to said DC to DC converter is below a preselected value.

5. A DC to DC converter in accordance with claim 4 further including means for sensing the current flowing through said switch and for turning off said switch when the current through said switch exceeds a preselected value.

6. A DC to DC converter in accordance with claim 5 further including means for holding said switch in the off state for a preselected time interval after the required operating voltage has been coupled to its input terminals.

7. A DC to DC converter in accordance with claim 6 further including a transformer for coupling said switch to a rectifier and filter circuit which rectifies and filters the secondary voltage of said transformer to produce said output voltage.

8. A DC to DC converter for converting an input voltage to an output voltage utilizing feed forward control to decrease the time required to compensate for changes in the input voltage, comprising in combination:
   (a) first means for generating a pulsed timing signal;
   (b) second means responsive to said pulsed timing signal for generating a pulse width modulated ramp signal, said second means including a series RC circuit coupled between the input terminals of said DC to DC converter and including circuitry responsive to a reset signal for selectively discharging and holding said RC circuit in a predetermined charge state for a predetermined time interval to generate said pulse width modulated ramp signal whose frequency is determined by said pulsed timing signal;
   (c) third means for generating a feed back signal having a predetermined relationship to the output voltage of said DC to DC converter;
   (d) fourth means for comparing said feed back signal to said pulse width modulated ramp signal to generate said reset signal;
   (e) fifth means responsive to said pulse width modulated ramp signal to convert said input voltage to said output voltage.

* * * * *